United States Patent
Walenty et al.

(10) Patent No.: US 6,877,371 B1
(45) Date of Patent: Apr. 12, 2005

(54) METHOD AND APPARATUS FOR DETECTING TIRE PRESSURE

(75) Inventors: Allen J. Walenty, Macomb, MI (US); Onno R. Van Eikema Hommes, West Bloomfield, MI (US); David M Ford, Huntington Woods, MI (US); J. David Rosa, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/704,369

(22) Filed: Nov. 7, 2003

(51) Int. Cl.$^7$ ............................................. B60C 23/02
(52) U.S. Cl. .................................... 73/146.5; 340/443
(58) Field of Search ................... 73/146.5; 340/443, 340/679

(56) References Cited

U.S. PATENT DOCUMENTS

| | | | | |
|---|---|---|---|---|
| 4,823,619 A | * | 4/1989 | D'Antonio et al. .... | 73/862.581 |
| 4,987,783 A | * | 1/1991 | D'Antonio et al. ........ | 73/432.1 |
| 5,279,163 A | * | 1/1994 | D'Antonio et al. ........... | 73/728 |
| 5,589,639 A | * | 12/1996 | D'Antonio et al. ........... | 73/724 |
| 2003/0058118 A1 | * | 3/2003 | Wilson ....................... | 340/679 |
| 2004/0130442 A1 | * | 7/2004 | Breed et al. ................ | 340/443 |

* cited by examiner

*Primary Examiner*—Edward Lefkowitz
*Assistant Examiner*—Andre Allen
(74) *Attorney, Agent, or Firm*—Christopher DeVries (57) ABSTRACT

A method and apparatus of characterizing for tire pressure imbalances in a set of tires of vehicle, the vehicle having four wheels, and each wheel having a sensor generating a pulse for a predetermined amount of distance traveled by the wheel including entering a first characterization mode, accumulating a number of pulses from each sensor and adding the number of pulses from each sensor to generate a first record total pulse count in the characterization mode, generating a second record total pulse count in the characterization mode, determining if the first record is similar to the second record, and discarding at least one of the first and second records if the first and second records do not meet a criteria.

29 Claims, 9 Drawing Sheets

METHOD AND APPARATUS FOR DETECTING TIRE PRESSURE

TECHNICAL FIELD

This invention relates to a method of and system for determining imbalances in tire pressure on vehicles equipped with wheel rotation sensors.

BACKGROUND OF THE INVENTION

Presently, manufactures and suppliers of automotive chassis control systems offer algorithms that use wheel speed for pneumatic tire inflation monitoring. The typical wheel speed based tire inflation-monitoring algorithm resides within an anti-lock brake controller. This system architecture is required because of the need for high resolution and high wheel speed data throughput. Present tire inflation systems rely on accurate microprocessor timer information to perform the required speed calculations. The measured time between speed ring teeth on a target wheel is used to calculate wheel speed and wheel slip. Due to the nature of these calculations, such systems are prone to noisy data at low and high speeds, under some road conditions, due to imprecise machining of speed ring teeth, and microprocessor timing limitations. A typical wheel speed based system may operate well while traveling in a straight line, at steady speeds, and on smooth surfaces, but exhibit a high rate of false warnings when conditions are not optimal.

SUMMARY OF THE INVENTION

While a vehicle is in motion, the present invention determines when any combination of wheels/tires are in a state of rotational error through an adaptive measurement of the distance that the four wheels have traveled substantially independent of any calculation of wheel speed.

More precisely, the present invention provides a method and apparatus to accurately monitor tire pressure imbalance through the measurement of distance by way of digital pulse devices that are coupled to a rotating wheel and/or included in existing anti-lock braking systems and vehicle transmissions. As the wheel(s)/tire(s) rotates the digital pulse device will provide a pulse train and a certain number of pulses will indicate the distance the tire has traveled and the number of revolutions of the tire. The digital pulse devices that may be used in the present invention include optical encoders, inductive wheel speed sensor, variable reluctance sensors, magneto-resistive sensors, and Hall effect sensors, but are not limited to such. Moreover, this invention does not rely on the measured time between digital pulses and will operate at the lowest possible speed at which a digital pulse may be sensed.

The indirect tire pressure monitoring system of the present invention preferably uses the relative change in revolutions per meter or kilometer (RPK) of a pneumatic tire to determine if the tire is losing pressure. The method of the present invention begins collecting distance data when a vehicle is moving. U.S. patent application Ser. No. 10/347,151 filed on Jan. 17, 2003 entitled "Method and System for Determining Tire Pressure Imbalances" discloses an apparatus and method for collecting distance data to determine tire pressure and is hereby incorporated by reference in its entirety. The present invention will operate and maintain accuracy equally as well at unrestricted high speeds and will operate expediently on any surface.

In the present invention, a calibration or characterization routine begins collecting distance data whenever the tire characterization is initiated via a manual switch or other manual or automated system. The term characterization is defined as calibrating or learning the rotational behavior of each tire or tires when the tires are rolling and they are in a nominal or good state i.e. the tires are generally properly inflated and are rotating normally. The records are preferably comprised of a count of digital pulses measured over a partial or full number of tire rotations. Preferably, the records comprise a specific sum of pulses from all four tires in a vehicle. The records may be combined into ratios or any other mathematical structure to track the distance traveled by each tire or tires.

A plurality of tests are performed on the digital pulse information from each tire to determine if all four tires are exposed to similar driving and environmental conditions. Further tests involve the repeatable nature of the digital pulse information. Data records that successfully pass the tests are accumulated and are subject to mid-distance repeatability tests. Successful mid-distance data is accumulated and is subjected to long distance repeatability tests. A successfully characterized record is accumulated whenever the old and new long distance data records are within a repeatable boundary.

The method of the present invention may use ratios formed by the distance data/records generated by the wheels/tires to determine tire conditions. Taking the total of one or more tire records and dividing by the total events/pulses of all the wheels to form distance ratios. In the present invention the vehicle includes a left front wheel (LF), a right front wheel (RF), a left rear wheel (LR) and a right rear wheel (RF). The present invention will preferably use the following three ratios:

$$\text{Diagonal ratio} = \frac{LF \text{ events} + RR \text{ events}}{LF \text{ events} + RF \text{ events} + LR \text{ events} + RR \text{ events}}$$

$$\text{Front ratio} = \frac{LF \text{ events} + RF \text{ events}}{LF \text{ events} + RF \text{ events} + LR \text{ events} + RR \text{ events}}$$

and $$\text{Left ratio} = \frac{LF \text{ events} + LR \text{ events}}{LF \text{ events} + RF \text{ events} + LR \text{ events} + RR \text{ events}}$$

Any other tire ratio of pulses or counts is considered within the scope of the present invention.

BRIEF DESCRIPTION OF THE DRAWINGS

This invention may be best understood by reference to the preferred embodiment and to the drawings in which:

FIGS. 2a–5b illustrate a flowchart of a preferred method of the present invention.

DESCRIPTION OF THE PREFERRED EMBODIMENT

Figure 1:
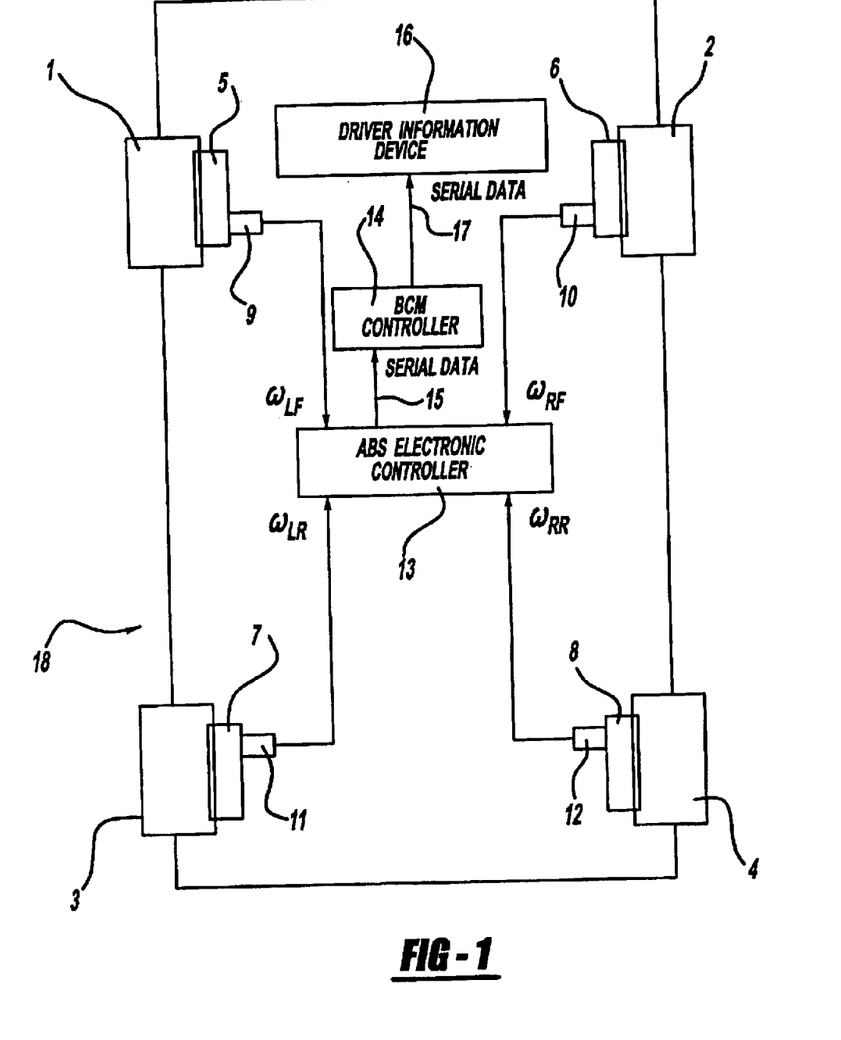
FIG. 1 is a hardware diagram of a vehicle equipped with an anti-lock braking system having a rotation sensor on each wheel.

Referring to FIG. 1, the present invention comprises a method and apparatus for detecting under-inflated tires for a vehicle 18 using distance traveled by each of the tires 1, 2, 3, and 4. For the purposes of this invention, only the mechanical and electrical components are shown. In the preferred embodiment of the present invention, the vehicle 18 is equipped with an Anti-lock Braking System (ABS) 13 and wheel rotation sensors 9, 10, 11, and 12 to sense all four wheel rotations. Alternatively, the system of the present invention does not require an ABS system, as wheel distance and speed information may be directly communicated to a Powertrain Control Module, a Body Control Module, and/or other vehicle controllers. The wheel rotation or digital pulse sensors 9, 10, 11, and 12 generate a predetermined number of pulses for each revolution of the wheel.

Referring to FIG. 1, when the left front tire 1 and the matching wheel bearing 5 rotate about an axis, an integrated machined tooth on a target wheel passes the wheel rotation or digital pulse sensor 9 generating a rising edge digital pulse upon first contact and a falling edge digital pulse when the tooth is no longer within the sensor's proximity. Tires 2, 3, and 4, wheel bearings 6, 7, and 8, and sensors 10, 11, and 12 operate in similar fashion. U.S. Pat. No. 6,591,670 filed on Sep. 20, 2000 entitled "Device for Detecting Wheel Speed Frequency" includes an exemplary digital pulse sensor and is incorporated by reference in its entirety. The digital pulse devices that may be used in the present invention, as previously described, include, but are not limited to, optical encoders, inductive wheel speed sensor, variable reluctance sensors, magneto-resistive sensors, and Hall effect sensors.

In the preferred embodiment of the present invention, an ABS controller 13 receives the rising and/or falling edge digital pulses for each wheel/tire and accumulates the individual and total sum of these pulses for each wheel/tire. The ABS system communicates the sum of the digital pulses of each individual wheel to a Body Control Module (BCM) 14 by way of a serial data interface 15, at regular intervals. As described previously, the digital pulses may also be directly communicated to other vehicle controllers independent of the ABS system 13 in a continuous or noncontinuous manner via a direct serial link or over an automotive communications network including, but not limited to, GMLAN, CAN, J1850 or similar communication protocols. The ABS system 13 merely provides an existing and convenient system to process and transmit the digital pulses.

As the present invention is based on the distance traveled, a more detailed description of the properties of this invention follows. The method is based on the measured distance traveled by each tire. The quantity of machined teeth and rolling circumference of each wheel determines the relationship between sensor pulses and distance. It is well known that a deflated tire has a smaller rolling radius. The basis for this invention is that an under-inflated tire will rotate a different distance per each full rotation than a properly inflated tire. For example, if a vehicle having four matching fifteen inch steel belted radial tires has one tire having a pressure of ten PSI less than the other three tires, then the under-inflated tire will need to rotate the equivalent of approximately 2.8 feet more than the three properly inflated tires in one-tenth of a mile. One rotation of the underinflated tire generally measures 6.3 feet and produces forty-eight digital pulses from a standard speed sensor in that distance. In one-tenth of a mile, the tires rotate approximately eighty-four times with each tire producing approximately four thousand and thirty-two digital pulses. The additional 2.8 feet of travel of the under inflated tire will produce an extra twenty-one digital pulses in one-tenth of a mile or one extra digital pulse every four wheel rotations.

The pulse counting method and apparatus of the present invention has the inherent ability to function properly at any vehicle speed, on any surface, and is relatively noise free under adverse driving conditions. A substantial advantage of this method is that it may be utilized in any vehicle controller, as long as it receives the wheel pulse count continuously, at regular intervals, and/or at irregular intervals. Unlike the prior art, the present system does not require a specific processing throughput because it merely counts pulses (other tire pressure monitoring systems require 10 millisecond control loops as they use speed or time between pulses, requiring high precision clock timing).

The calibration or characterization of the digital pulse information provides data that is used to determine if a tire is over or under pressure. The present invention utilizes a primary characterization and secondary characterization method. The primary characterization method is preferably completed in less than twenty minutes, as dictated by present government regulations. The secondary characterization may happen over a period of hours or days to fine-tune the calibration and characterization process.

Referring to FIGS. 1 and 2a–5b, a method of calibration or characterization is diagrammed to illustrate the control processes of the preferred embodiment. Wheel rotation is measured by the ABS controller 13 and all of the digital pulse transitions from wheel speed or digital pulse sensors 9, 10, 11, and 12, are accumulated by the ABS controller 13 and the total and/or individual sums of each wheel are transmitted to the BCM 14 at a convenient time interval. In alternate embodiments of the present invention, the digital pulse outputs for the sensors 9, 10, 11, and 12 are coupled directly to the BCM 14, a Powertrain Controller, or any other similar controller used in a vehicle.

Figure 2A:
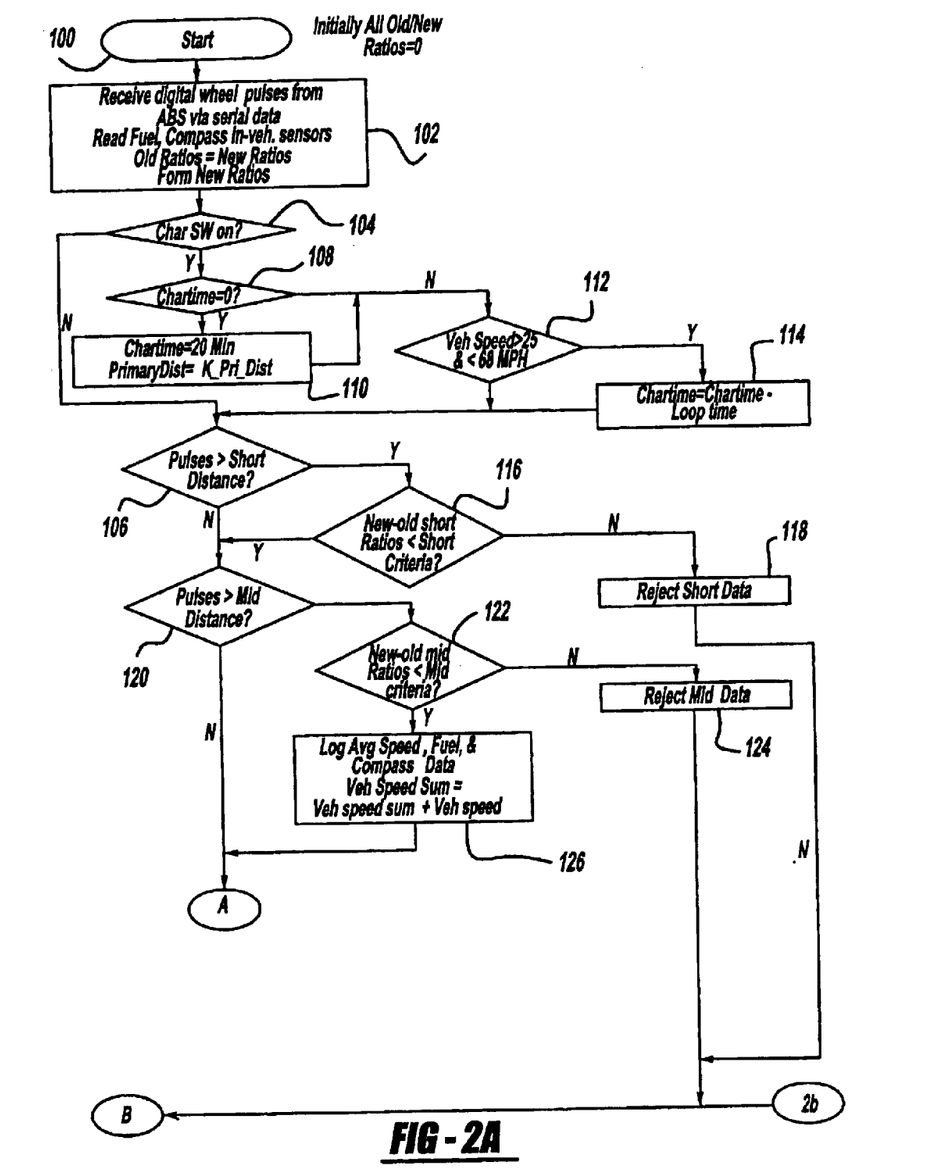
Figure 2B:
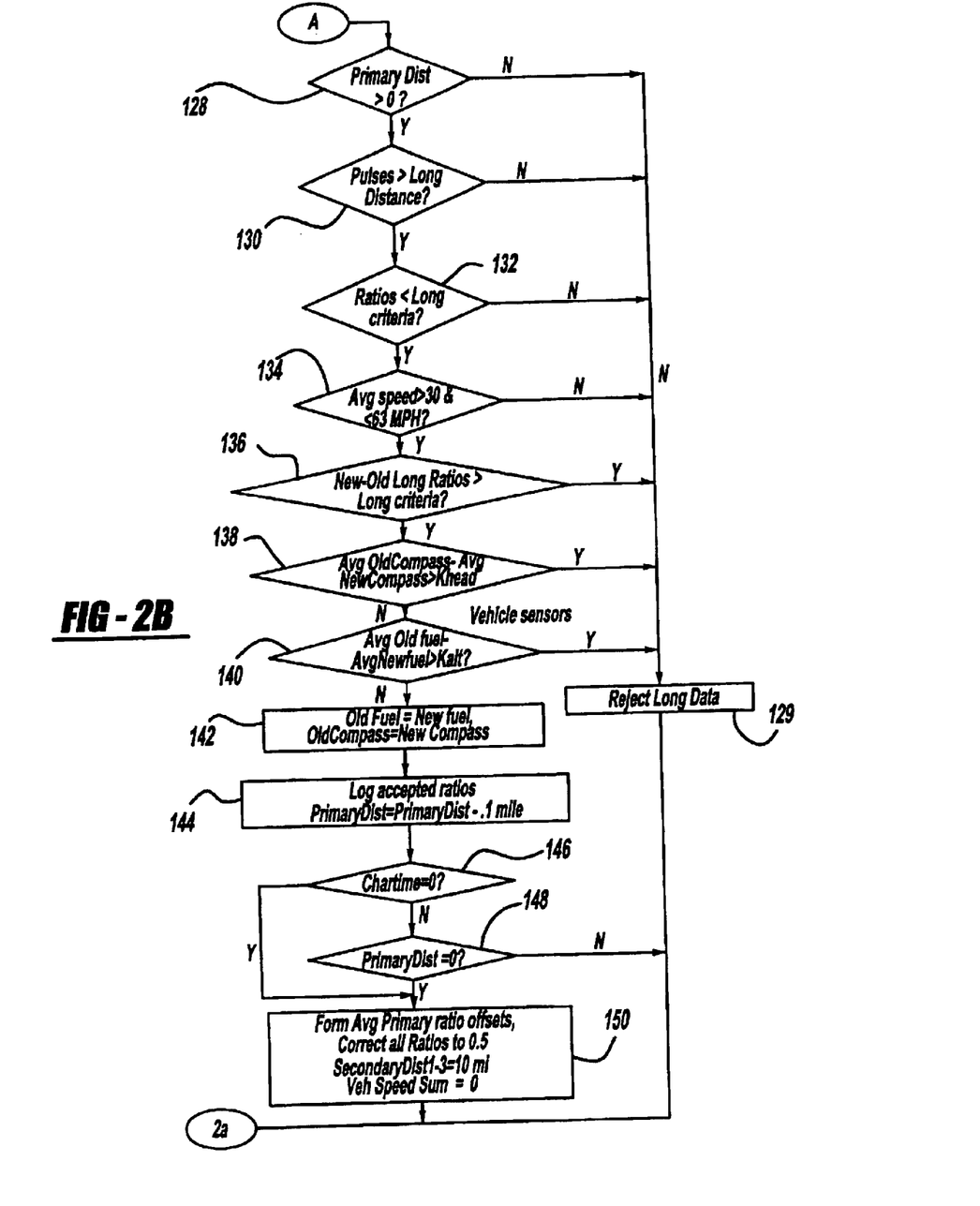

FIGS. 2a–2b illustrate the primary characterization portion of the present method. The method starts at block 100 of FIG. 2a where an operator preferably has verified the proper inflation of the tires before starting this method. Block 100 preferably determines the suitability of the data for determining tire pressure imbalance. A series of steps are performed to see if the vehicle is stable. Typical criteria used are: acceleration below a threshold, wheel slip and grip below a threshold, turning radius above a limit, repeatability of ratios, and other similar criteria.

At block 102, records from the digital pulse sensors 9, 10, 11, and 12, are collected. As disclosed previously, a record is preferably a pulse count from the digital pulses sensors 9, 10, 11, and 12. The record may comprise a total pulse count from all the digital pulse sensors 9, 10, 11, and 12, individual pulse counts for each tire, and/or a ratio of pulse counts for the tires 1, 2, 3, and 4, but is not limited to such. Any mathematical manipulation of the digital pulses from the digital pulse sensors 9, 10, 11, and 12 may be considered a record within the scope of the present invention. The digital pulse count and/or counts, in a preferred embodiment, are processed by the ABS system 13 and transferred to the BCM 14. Various other sensors including, but not limited to, a fuel level sensor and an electronic compass are also processed at block 102. The current ratios become the old ratios when the new records and ratios are generated at block 102.

Block 104 determines if a manual characterization switch (Char SW) has been activated to start the characterization process. The present method may also be started by certain predetermined activating conditions such as a production line process, the removal of a spare tire, or when a low tire alert is cleared during normal operation or during a secondary characterization, but is not limited to such. If the characterization switch is not on, then the method will continue to the pulse counting portion of the method at block 106. If the characterization switch is on or an automatic trigger has occurred, then the primary characterization process will begin at block 108 which determines whether the primary characterization time (Chartime) is set to zero. Zero indicates that the primary characterization has been completed.

If the variable Chartime, is zero then the method will continue to block 110 where Chartime is set to twenty minutes and the primary distance over which the characterization will be determined (PrimaryDist) is set to a value K_Pri_Dist (preferably two miles). The method then continues to block 112 to determine if the vehicle speed (Veh Speed) is in a certain speed band, greater than twenty-five miles per hour (mph) and less than sixty-eight mph. The vehicle speed band is a requirement of government regulation MVSSI 138, but the present invention contemplates any speed band that may be required to comply with government regulations or the functioning of the vehicle.

The present invention tracks speed during the primary characterization while collecting records to compensate for the centrifugal force applied to tires 1, 2, 3, and 4. Most commercially available tires will deform relative to the centrifugal force applied upon them due to rotational speed. Any speed band may be used by the present invention where relatively repeatable and stable digital pulse information is collected. For example, for a speed band of 31–62 mph, if five records are taken at 55, 63, 63, 64, and 63 mph only one record will have been collected inside the speed band. The present invention may average the records to determine if they fall within the speed band. When averaged the five records have an average speed of 61.5 mph which falls within the speed band (of 31–62 mph).

If the vehicle is traveling within the speed band, then the Chartime is set equal to Chartime minus the time it takes to execute a program loop (Loop Time) at block 114. The Chartime is decremented by the Loop Time whenever a valid record is taken within the speed band.

The total number of digital pulses (pulses) (the distance equivalent, X number of pulses=X distance traveled) or records are examined at block 106 to determine if the distance traveled is greater than the variable, Short Distance. As previously described, the record comprises a set of pulses/counts preferably equal to a certain distance, but any number of counts or distance is within the scope of the present invention. The record may also comprise a ratio of counts/pulses including, but not limited to, the diagonal, front and left side ratios.

The Short Distance measurement in block 106 preferably comprises substantially 6.3 feet, but is not limited to such. If the total pulses/corresponding distance traveled are greater than the Short Distance, then at block 116 the old ratios are subtracted from the new ratios to determine whether the new ratios fall within the short distance criteria (Short Criteria). The ratios, as previously described are the ratios of the individual pulse sums of each tire over the Short Distance traveled. The Short Criteria is used to ensure that the new records are substantially consistent with the old records. If the new ratios do not meet the Short Criteria, then the newly collected record is rejected at block 118.

The record or total number of digital pulses is examined at block 120 to determine if the distance traveled is greater than the variable, Mid Distance. The Mid Distance measurement in block 120 preferably comprises substantially 88 feet, but is not limited to such. If the total pulses/corresponding distance traveled are greater than the Mid Distance, then at block 122 the old ratios are subtracted from the new ratios to determine whether the new ratios fall within the mid distance criteria (Mid Criteria). The ratios, as previously described are the ratios of the individual pulse sums of each tire over the Mid Distance traveled. The Mid Criteria is used to ensure that the new records are substantially consistent with the old records. If the new ratios do not meet the Mid Criteria, then the newly collected record is rejected at block 124. If the new ratios meet the Mid Criteria, then the average speed, compass heading, and fuel level data is logged at block 126. The average speed data is logged by summing the vehicle speed at which a successful Mid Distance record is collected and then dividing the sum (Veh Speed Sum) by the number of successful passes through the Mid Criteria routine.

Continuing to block 128, the present method determines if the Primary Dist is greater than zero. This determination is used to determine if the primary characterization portion of the method is complete. If the Primary Dist is not greater than zero, then the method will continue to the secondary characterization portion of the method in FIG. 2b. If the Primary Dist is greater than zero, then the method will progress through a number of decision making blocks in which a determination rejects the long data at block 129 and directs the method to the secondary characterization part of the present method.

Block 130 determines if the record's total pulses/corresponding distance traveled are greater than the Long Distance (corresponding to a long distance traveled preferably 528 feet ($\frac{1}{10}^{th}$ mile), but not limited to such). Block 132 determines if the ratios fall within the long distance criteria (Long Criteria=acceleration below a calibration, lateral acceleration below a calibration). Block 134 determines if the records have been collected in a speed band between 31 mph and 62 mph (>30 & <63 mph). At block 136, the old long ratios are subtracted from the new long ratios to determine whether the new ratios fall within the long criteria (Long Criteria). The ratios, as previously described are the ratios of the individual pulse sums of each tire over the Long Distance traveled.

The Long Criteria is used to ensure that the new records are substantially consistent with the old records. If the new ratios do not meet the Long Criteria, then the newly collected record is rejected at block 129. If the new ratios meet the Long Criteria, then at block 138 the present method reviews a new electronic compass heading (New Compass) and old electronic compass heading (Old Compass) to determine if the car is on a long curve where the tire records (preferably left side) might be invalid. The variable or constant Khead is used determine if the heading indicates an invalid record. Similarly, at block 140 the float sensor (Old Fuel and New Fuel) is used (or another well known method of desired acceleration versus actual acceleration) to determine if the vehicle is on a grade where a collected record may be invalid (preferably this test applies to front tire records).

The variable or constant Kalt is used to determine if the grade of the vehicle indicates an invalid record. Block 142 sets the New Fuel and New Compass readings to the Old Fuel and New Fuel for the next record.

Block 144 logs the accepted records and ratios into the memory of the BCM 14. The number of records stored may be any number of records to comply with government regulations and the processing requirements of the present system. The variable PrimaryDist is further decremented a tenth of a mile at block 144. The decrementing of the PrimaryDist variable is used in conjunction with block 128 to determine when the method exits from the primary characterization portion of the present method.

Block 146 determines if the Chartime is equal to zero. If the Chartime is equal to zero or the twenty minutes set at block 110 has expired, then the method preferably exits the primary characterization routine to block 150 where the average primary ratio offsets are generated and the Veh Speed sum is set to zero. The average primary ratios are formed by dividing all summed ratios by the number of successful ratios that were collected during the primary characterization. All ratios are corrected to one half and the secondary distances/odometers SecDist1–3 are preferably set to 8, 16, & 32, miles respectively. The offsets are formed by subtracting the average ratios from 0.5. Where the diagonal ratio offset is equal to 0.5 minus the average diagonal ratio.

The secondary characterization distances are the distances used in the secondary characterization of the tires 1, 2, 3, and 4 of the vehicle 18. Presently, the secondary characterization does not have a time limit associated with it. If the Chartim is not equal to zero, the block 148 will determine if the PrimaryDist is zero. If the PrimaryDist is zero, the method will continue to block 150. If the PrimaryDist is not zero, the method will continue to FIG. 2b.

Figure 3A:
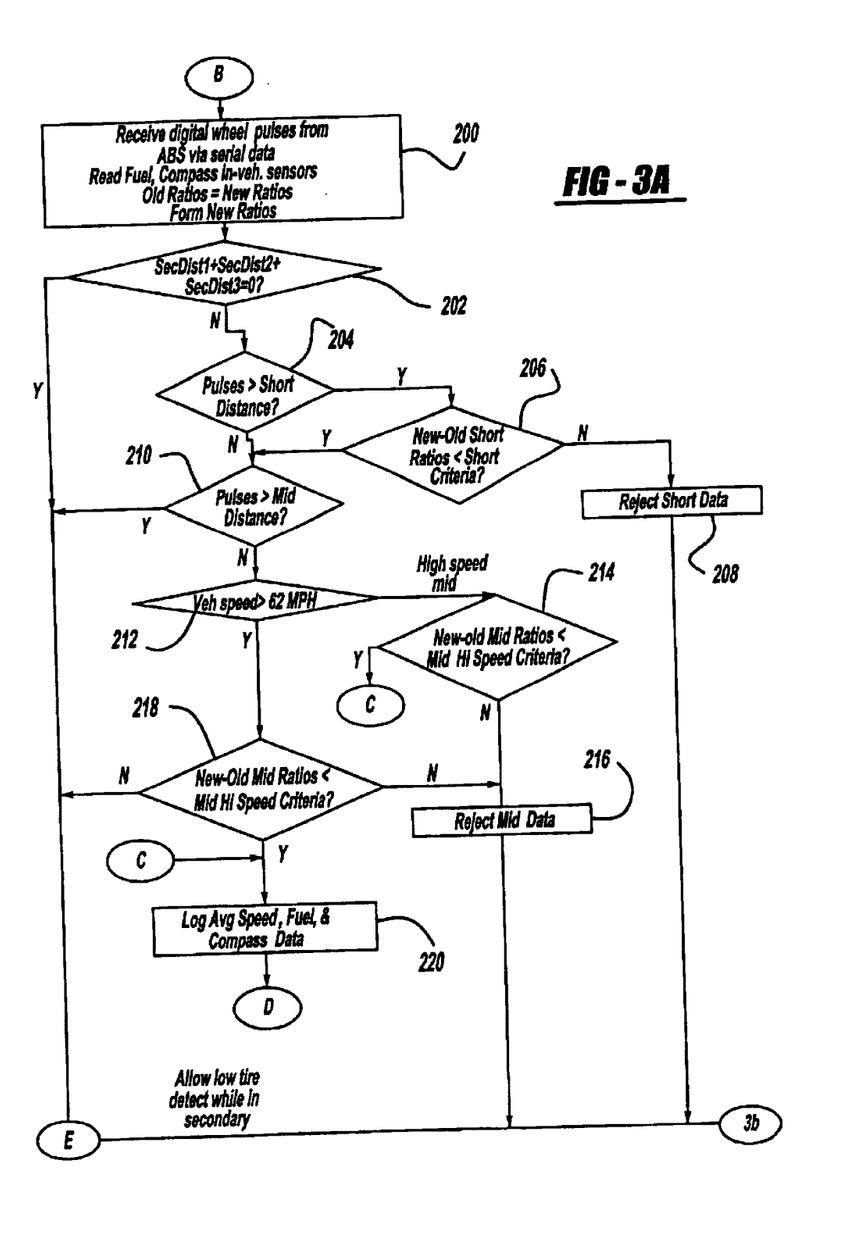
Figure 3B:
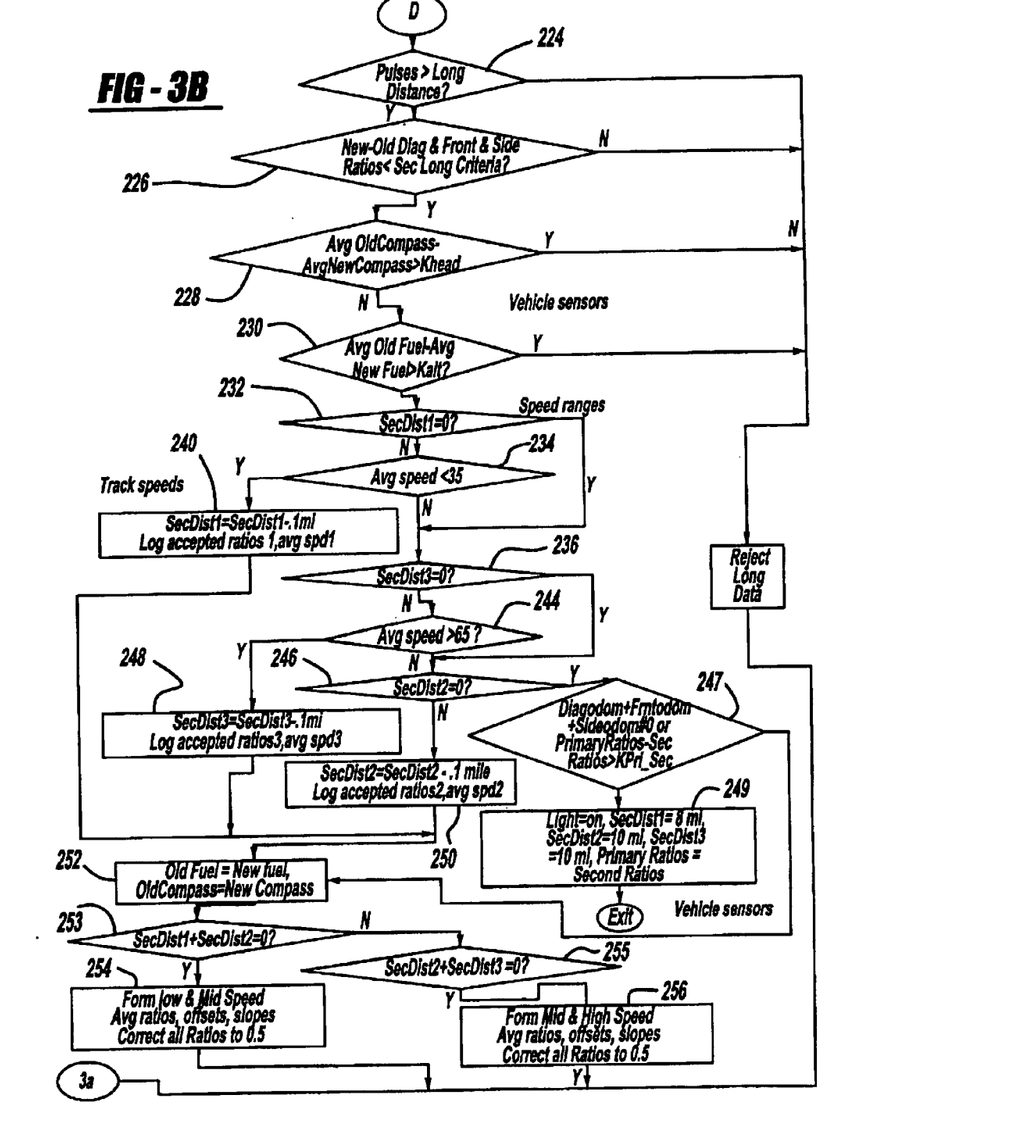

Referring the to FIGS. 3a–3b of the present method, the secondary characterization collects data at all speed ranges and sums the data in a corresponding speed range data bank, updates the individual speed range specific odometer (such as a calibratable distance e.g. 8 miles for low speed, 16 miles for mid speed, and 32 miles for high speed, but any distance is considered within the scope of the present invention) and sums the average vehicle speed of each record in that speed range. For example, if three records are taken at 65, 75, and 85 mph, the average speed of this speed band is 75 mph.

During Secondary Characterization, data is not collected in a specific speed range or band when the odometer for that speed range is exhausted (=0). When at least two speed range odometers are exhausted, characterization slopes and offsets are created and low tire detection is enabled for those two speed ranges. When the primary characterization is finished low tire detection is operational within the MVSS138 speed band of 50–100 KPH. When the secondary characterization completes the low and mid speed bands, or the mid & high speed bands, low tire detection will be preferably operational only in those two speed bands. The third speed band will preferably become operational only upon completion. Preferably, upon completion of the secondary characterization the primary characterization will be discarded and the secondary characterization will then be used to determine tire pressure faults. However, if the difference between the primary Mid Speed Ratios and the secondary characterization Mid Speed Ratios are not repeatable, the low tire telltale may be illuminated, informing the driver that a slow leak or other tire problem exists. One way to determine a tire problem is to examine the low tire detection odometers. When any detection odometer is not equal to zero it means that a low tire condition existed but the odometer did not reach the adaptive detection activation distance. Another way to determine a tire problem is when the difference between the primary and secondary Mid Speed Ratios exceed calibration, Kpri_vs_Sec. This calibration represents a specific change in RPK that is at or near the low tire pressure detection threshold. Hopefully, the tire pressures are checked and the secondary characterization maybe automatically repeated to allow a change in RPK that occurs in certain rare tires during a break-in period.

The secondary characterization portion of the present method will generally be a more accurate gauge of tire behavior because of the break-in time period for the tires and the larger sample of measurements taken over time.

The secondary characterization portion of the present method begins at block 200 of FIG. 2b where records from the digital pulse sensors 9, 10, 11, and 12 are collected. As disclosed previously, a record is preferably a pulse count or some mathematical transformation of the pulse counts from the digital pulses sensors 9, 10, 11, and 12. The record may comprise a total pulse count from all the digital pulse sensors 9, 10, 11, and 12, individual pulse counts for each tire, and/or a ratio of pulse counts. As previously disclosed, the digital pulse count in a preferred embodiment is processed by the ABS system and transferred to the BCM 14. Block 202 adds the secondary distance values 1, 2, and 3 (SecDist1, SecDist2, and SecDist3) to determine if they are equal to zero. Block 202 determines if the method of the present invention has completed the secondary characterization by determining if the sum of the secondary distance values is zero.

The Short Distance measurement in block 204 preferably comprises about 6.3 feet, but is not limited to such. If the total pulses/corresponding distance traveled are greater than the Short Distance, then at block 206 the old ratios are subtracted from the new ratios to determine whether the new ratios fall within the short distance criteria (Short Criteria) at block 206. The ratios, as previously described are the ratios of the individual pulse sums of each tire over the Short Distance traveled. The Short Criteria is used to ensure that the new records are consistent with the old records. If the new ratios do not meet the short criteria, then the newly collected record is rejected at block 208.

The total number of digital pulses or record is examined at block 210 to determine if the distance traveled is greater than the variable, Mid Distance. The Mid Distance measurement in block 210 preferably comprises 88 feet, but is not limited to such. If the total pulses/corresponding distance traveled are greater than the Mid Distance, then the method will continue to the low tire pressure detection portion of the present method. If the total pulses are not greater than Mid Distance, then the method continues to block 212.

Block 212 determines if the vehicle speed is greater than 62 mph. If the vehicle speed is greater than 62 mph, then at block 214 the method will determine if New minus Old Mid Distance ratios are less than the Mid Hi Speed Criteria. If the new ratios do not meet the Mid Distance Criteria the records will be rejected at block 216. If the New minus Old Mid Distance ratios meet the Mid Distance Hi Speed Criteria the routine will continue to block 220. If the vehicle speed is not greater than 62 mph, then the method will continue to block 218 to determine if the New minus Old Mid Distance ratio meets the Mid Criteria. If the New minus Old Mid Distance Ratio does not meet the Mid Hi Speed Criteria, then the collected Mid Data will be rejected at block 216. If the New minus Old Mid Distance Ratio data meets Mid Hi Speed Criteria, then the records and average speed, fuel, and compass data for a mid distance in the secondary characterization will be logged to memory in the BCM 14 at block 220.

Continuing to block 224, the present method determines if the record's total pulses/corresponding distance traveled are greater than the Long Distance (corresponding to a long distance traveled preferably 528 feet or $1/10^{th}$ mile, but not limited to such). Block 226 determines if the New minus Old Distance Ratio fall within the secondary long distance criteria (Sec Long Criteria). In the preferred embodiment of the present inventions, every ratio disclosed in this description may be tested against the Sec Long Criteria.

At Block 228, a new average electronic compass heading (Avg New Compass) and old average electronic compass heading (Avg Old Compass) are reviewed to determine if the car is on a long curve where the tire records might be invalid. The variable or constant Khead is used determine if the heading indicates an invalid record (preferably the side ratios). Similarly, at block 230 the float sensor (Average Old Fuel and Average New Fuel) is used to determine if the vehicle is on a grade where a collected record may be invalid. The variable or constant Kalt is used to determine if the grade of the vehicle indicates an invalid record (preferably the front ratios).

Block 232 determines if the vehicle has traveled the distance required by the second distance (SecDist1) variable. This is the distance of travel that is used to end secondary data collection in the low speed band. If the vehicle has traveled the SecDist1, then the method continues to block 236. If the vehicle has not traveled the SecDist1, then block 234 determines if the average speed of the vehicle is less than 35 mph. If the average speed of the vehicle is not less than 35 mph, then the routine will continue to block 236. If the average speed of the vehicle is less than 35 mph, then at block 240, the SecDist1 will be decremented by a tenth of a mile, the records and ratios will be logged and the average speed will be recorded with the records and ratios in the BCM 15.

Block 236 determines if the value SecDist3 is equal to zero which signals that the record collecting at SecDist3 has been completed. SecDist3 is the distance of travel used to end secondary data collection in the high speed band. If SecDist3 is equal to zero, the method continues to block 246. If SecDist 3 is not equal to zero, then block 244 determines if the average vehicle speed is greater than 65 mph. If the average vehicle speed is not greater than 65 mph, the method will continue to block 246. If the average speed is greater than 65 mph, then at block 248 a tenth of a mile will be decremented from SectDist3 and the records and ratios will be logged into the memory of the BCM 15.

Block 246 determines if the variable SecDist2 is equal to zero (similar to SectDist3). SecDist2 is the distance of travel used to end secondary data collection in the mid speed band. If SectDist2 is not equal to zero, then at block 250 a tenth of a mile will be decremented from SecDist 2 and the records and ratio will be logged into the memory of the BCM 15. If SecDist2 is equal to zero, the method will continue to block 247. At block 24, if the sum of DiagOdometer, FrontOdometer, and SideOdometer (determining if any tire counting down a low tire detection at any time during secondary characterization) are not equal to zero or if the difference between the primary mid speed ratios (Primary Ratios) and the secondary mid speed ratios (Sec Ratios) exceed calibration, KPri_Sec (too far apart, not repeatable), the method proceeds to block 249, which illuminates the low tire telltale starts automatic re-characterization of certain rare tires that change RPK during a break-in period by replacing the primary ratios with the secondary Median Speed ratios and resetting the secondary distance odometers, SecDist1–3 then exits.

If the sum of DiagOdometer, FrontOdometer, and SideOdometer are equal to zero and the difference between the primary mid speed ratios and the secondary mid speed ratios is less than calibration, KPri_Sec, the method proceeds to block 252, which has similar function as block 142. When at least two speed range odometers are exhausted, characterization slopes and offsets are created and low tire detection is enabled for those two ranges. At block 253, If SecDist1 and 2 are exhausted, the method proceeds to block 254 which calculates the offsets and slopes for low and mid speed. At block 253, If SecDist1 and 2 are not equal to zero, the method proceeds to block 255. At block 255, If SecDist2 & 3 are zero, the method proceeds to block 256 which calculates the offsets and slopes for mid & high speed ratios.

Offsets are the difference between one-half (0.5 or $8000 in hex) and the average like-ratios at each speed band and the slope is used to make adjustments above selected speeds in each band. The centrifugal forces produced on the diagonal and left ratios typically cancel each other out because each of these ratios has one driven and one undriven wheel. However, poorly constructed tires may change RPK at different speeds in a nonlinear fashion. The front ratio includes two driven wheels, which propel the vehicle and produce more wheel slip at higher speeds. The secondary characterization saves each ratio in each speed band.

The offset is formed by subtracting each ratio value from the nominal ratio of 0.5 or $8000 hex. Assume that the low speed band ratios are LFRR=0.5 ($8000), LFRF=0.5006 ($8028), LFLR=0.5 ($8000), and average low speed (C1SPD)=28 MPH. The offsets are formed, $LFRR1$ offset=0.5−0.5=0, $LFRF1$=0.5−0.5006=−0.0006, $LFLR1$=0.5−0.5=0.

Assume that the ratios at the mid speed band (>31 MPH, <62 MPH) are LFRR=0.500046 ($8003), LFRF=0.5009 ($803B), LFLR=0.499954 ($7FFD), and average low speed (C2SPD)=48 MPH. The offsets are formed, $LFRR2$ offset=0.5−0.500046=−0.000046, $LFRF2$=0.5−0.5009=−0.0009, $LFLR2$=0.5−0.49995=0.000046.

Assume that the ratios at the high speed band (>62 MPH) are LFRR=0.50009 ($8006), LFRF=0.5012 ($804B), LFLR=0.499908 ($7FFA), and average low speed (C3SPD)=68 MPH.

The offsets are formed, $LFRR3$ offset=0.5−0.5001=−0.00009, $LFRF3$=0.5−0.50114=−0.00114, $LFLR3$=0.5−0.4999=0.000092.

The low to mid speed slopes are the calculated difference between low/mid speed bands, where:

$LFRRslope1 = (LFRR2 - LFRR1)/(C2SPD - C1SPD) = -0.0000023$ $LFRFslope1 = (LFRF2 - LFRF1)/(C2SPD - C1SPD) = -0.000015$ $LFLRslope1 = (LFLR2 - LFLR1)/(C2SPD - C1SPD) = 0.0000023$ The mid to high speed slopes are the calculated difference between mid/hi speed bands, where:

$LFRRslope2 = (LFRR3 - LFRR2)/(C3SPD - C2SPD) = -0.0000022$ $LFRFslope2 = (LFRF3 - LFRF2)/(C3SPD - C2SPD) = -0.00003$ $LFLRslope2 = (LFLR3 - LFLR32)/(C3SPD - C2SPD) = 0.0000022$ The proper offset and slope are used at any speed using vehicle speed with this example logic;
If vehicle speed>C1SPD and >C2SPD but<C3SPD do the following
E.g. If vehicle speed=55 MPH then $LFRR$ ratio=($LFRR$ ratio+$LFRR2$ offset)+((Vehicle speed−C2SPD)*$LFRRslope2$) or 0.5=(0.5000614+−0.00046)+((55−48)*−0.0000022.

Slopes are used when exceeding the speed at which the data was collected. The offsets and slopes are added to the raw ratios.

The lack of a time constraint in the secondary characterization allows greater flexibility in the sample size of records that need to be collected before determining the final characterization offsets and slopes. Furthermore, the method of the present invention can monitor tire digital pulse outputs (corresponding to tire pressure) to determine if a tire has low pressure. If false positives or a tire pressure fault is detected before the secondary characterization has been finished, the secondary characterization will be cleared and the primary characterization will continue to be used to determine if a tire is losing pressure. Upon correction of the false positive or tire pressure fault, the secondary characterization process will start over. (Automatic characterization)

Figure 4A:
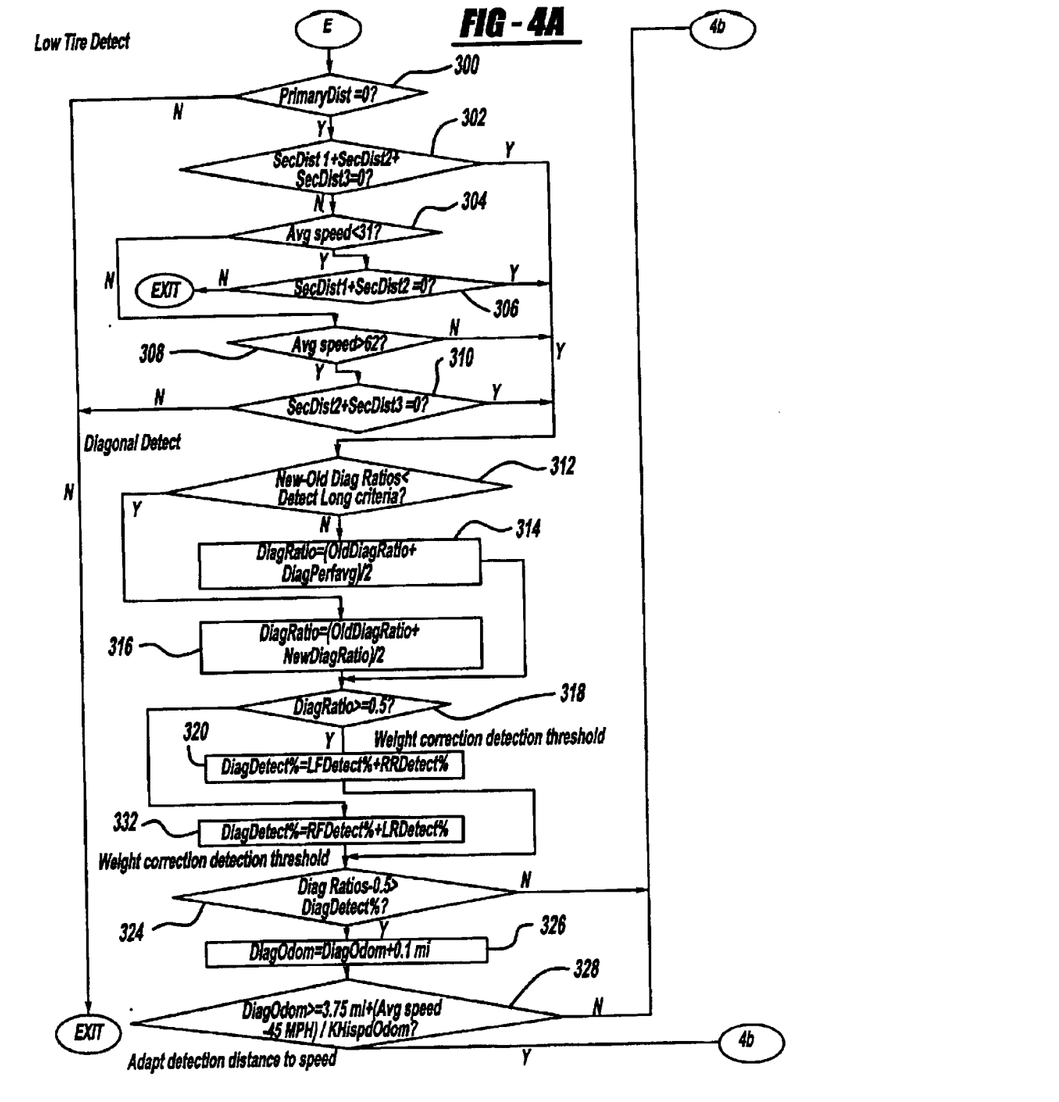
Figure 4B:
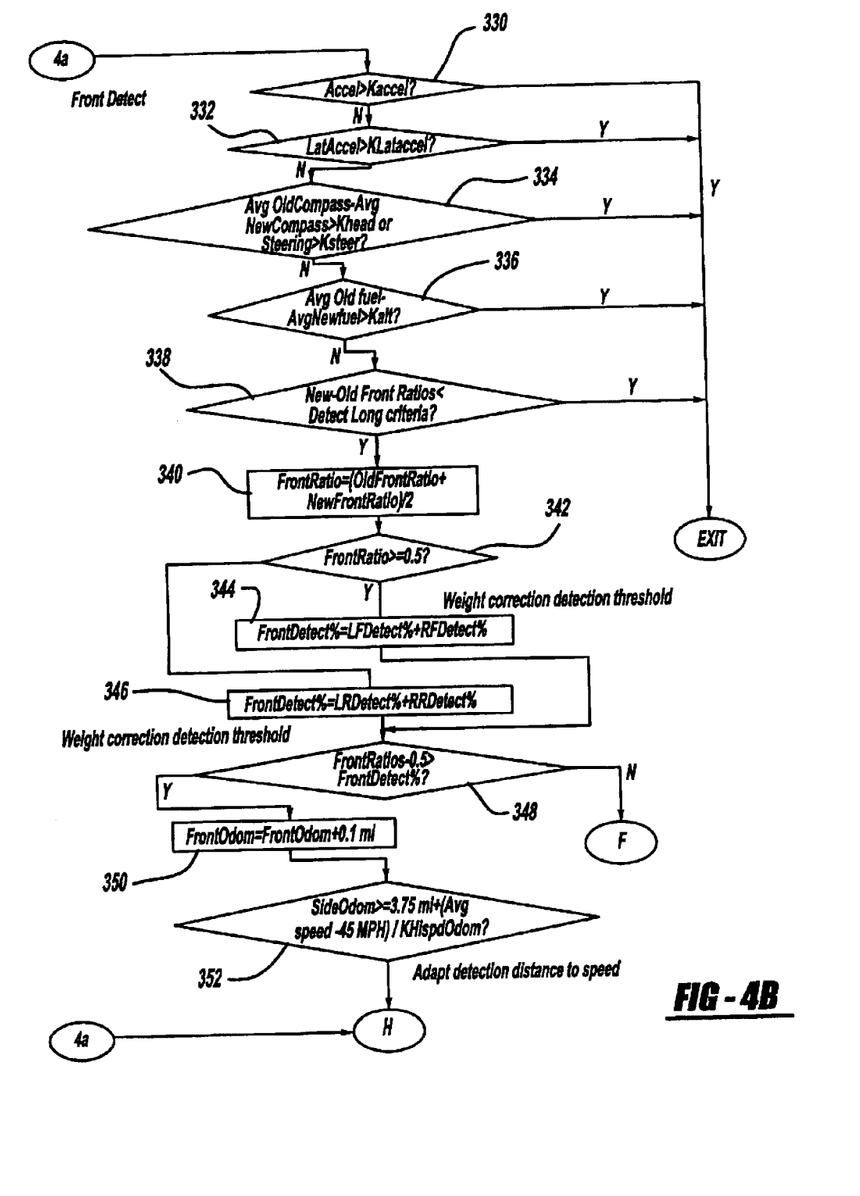

FIGS. 4a–4b comprise a low tire detection portion of the present preferred method. Block 300 determines if the method is in the primary characterization execution by determining if PrimaryDist is equal to zero. If the method is executing the primary characterization, the method will exit, as no records exist to determine if a tire is low. If the PrimaryDist is equal to zero, the method continues to block 302 to determine if the method is executing the secondary characterization by determining if the sum of SecDist1, 2, and 3 are zero. If the method is finished with the secondary characterization, the method will continue to block 312.

If the method is not finished with the secondary characterization, the method continues at block 304, the present method determines if the average speed of the vehicle is less than 31 mph. If the average speed is less than 31, then the routine will determine if the SecDist1 and SecDist2 are equal to zero and exit the routine if the SecDist1 and 2 are not equal to zero. If SecDist1 is not equal to zero, the low speed secondary characterization is not complete and low tire testing is not allowed at this speed range and the method will exit. If SecDist1 and SecDist2 are both equal to zero (blocks 306), low tire detection is allowed to be performed at low speed and proceeds to block 312.

If the average vehicle speed (Avg Speed) is greater than or equal to 31 mph, then the method will continue to block 308 to determine if the Avg Speed is greater than 62 mph. If the Avg Speed is greater than 62 mph, the method will continue to block 310 to determine if SecDist2 and SecDist3 are equal to zero. If the Avg Speed is greater than 62 mph and the SecDist2 and SectDist3 are equal to zero the method will continue to block 312. If SecDist2 and SecDist3 are not equal to zero, the high speed secondary characterization is not complete and low tire testing is not allowed at this speed range and the method will exit. If SecDist2 and SecDist3 are both equal to zero, low tire detection is allowed to be performed at high speed and proceeds to block 312.

Starting at block 312, the diagonal ratio detection portion of the present method is used to determine if a tire is low. Block 312 determines if the new diagonal ratios (LFRR) meet the Detect Long Criteria by subtracting old ratios from new ratios. If the new ratios do not meet the criteria, then steady state averaging will be done at block 314. If the new ratios meet the criteria, then the diagonal ratio (DiagRatio) will be set equal to an average of the old ratios and new ratios at block 316.

Block 318 determines if the DiagRatio is greater than or equal to one half to determine if a tire is going low. The DiagRatio as shown by Table 1 can detect numerous conditions where a tire or tires are low. The front ratio increases when one or both front tires 1 and 2 are losing air and the front ratio decreases when one or both rear tires 3 and 4 are losing air. For example:

Each Wheel speed ring preferably has 47 teeth and 94 rising and falling edges.

The rolling radius of each tire is 6.3 ft.

$1/10^{th}$ mile=528 ft.

528/6.286=84 revolutions*94 edges=7896 edges per wheel, 31,584 edges 4-tires.

When the front tires land 2 lose air pressure the total edge count of the front tires 1 and 2 increases.

$$LF = 7907 \quad RF = 7907$$

$$LR = 7885 \quad RR = 7885$$

$$\frac{LF + RF}{LF + RF + LR + RR} = 0.500733 * 65536 = \$8030 \text{ h} = +\$30 \text{ h}$$

When the rear tires 3 and 4 lose air pressure the total rear edge count increases more than front tires 1 and 2.

$$LF = 7879 \quad RF = 7879$$

$$LR = 7913 \quad RR = 7913$$

$$\frac{LF + RF}{LF + RF + LR + RR} = 0.49895 * 65536 = \$7FBB \text{ h} = -\$45$$

A dual front low-tire detection threshold is used whenever the front ratio increases from the nominal (characterized) value and a separate dual rear low-tire detection threshold is used whenever the front ratio decreases. For example, at 30% below placard pressure (The placard pressure is the vehicle manufacturer's recommended cold tire pressure and the percentage are NHTSA requirements.) the front tires land 2 will travel an additional 3 feet in $1/10^{th}$ mile and the rear tires 3 and 4 will travel an additional 4.5 feet in $1/10^{th}$ mile. This method equalizes the disparity between the front 1 and 2 and rear tires 3 and 4.

All distance tire ratios used in the present invention will reflect changes in the rolling radius of one or more tires due to pressure loss or other pressure fault. The changes in the three ratios can be used to specifically identify which tires are low using unique detection thresholds that will ensure a uniform detection at the same loss of pressure with any combination of tires in the front or rear of the vehicle. This method resolves separate detection thresholds for all combinations of low tires. Identification of which tire(s) are losing pressure can be accomplished using the logic in the following ratio truth table. Table 1 can be used to identify which tire(s) are losing pressure as well as determine the correct low tire detection threshold for any tire or combination of tires.

TABLE 1

Example low tire scenarios and ratio shift.

| Low Tire scenarios Nominal-Characterization −10 PSI each tire | Diagonal $8000 | Front $8000 | Left side $8000 | Diagonal 1 > $8000 Truth table | Front 0 = $8000 | Left side −1 < $8000 | Unique Code |
|---|---|---|---|---|---|---|---|
| LF | 8017 | 8017 | 8017 | 1 | 1 | 1 | 7 |
| RF | 7FE9 | 8017 | 7FE9 | −1 | 1 | −1 | −5 |
| LR | 7FDF | 7FDF | $8021 | −1 | −1 | 1 | −6 |
| RR | 8021 | 7FDF | 7FDF | 1 | −1 | −1 | −3 |
| LF + RF | 8000 | 802E | 8000 | | 1 | | 2 |
| LR + RR | 8000 | 7FBE | 8000 | | −1 | | −2 |
| LF + LR | 8000 | 8000 | 8038 | | | 1 | 1 |
| RF + RR | 8000 | 8000 | 7FC8 | | | −1 | −1 |
| LF + RR | 8038 | 8000 | 8000 | 1 | | | 4 |
| RF + LR | 7FC8 | 8000 | 8000 | −1 | | | −4 |
| LF + RF + LR | 7FDF | 8021 | 8021 | −1 | 1 | 1 | 3 |
| LF + RF + RR | 8021 | 8021 | 7FDF | 1 | 1 | −1 | 6 |
| LF + RR + LR | 8017 | 7FE9 | 8017 | 1 | −1 | 1 | 5 |
| RF + RR + LR | 7FE9 | 7FE9 | 7FE9 | −1 | −1 | −1 | −7 |
| LF + RF + RR + LR | 8000 | 7FF6 | 8000 | | | | 0 |

The logic includes a coding system represented in a binary progression matrix. The unique code in the table corresponds to the tire or tires that have a pressure fault.

Where the diagonal ratio holds the highest value of a binary 4, the front ratio holds the middle value of a binary 2, and the left ratio holds the value of a binary 1. The present logic assigns nothing to nominal diagonal ratios of $8000, +/−5 (calibration), assigns a positive sign to ratios greater than $8005 (calibration) and a negative sign to ratios below $7FFA (calibration). As described previously, the value $8000 corresponds to a 50% ratio in hexadecimal. The same logic is applied to the left and front ratios using different calibrations of +/−10 and +/−12 respectively.

Referencing LF (left front) low in table 1 all three ratios increase due to the inclusion of the left front wheel in all three ratio calculations. The aforementioned logic will assign +4 to the diagonal ratio, +2 to the front ratio, and +1 to the left ratio equaling a total of 7. If the RF, RR, and LR are all low the logic will yield all negative numbers equaling −7 for this 3 low tire scenario. A low left front tire is mathematically opposite to that of the left front with 10 PSI more pressure than the other three tires, which corresponds to RF, LR, & RR low. All 15 low tire scenarios produce different ratio values.

The present invention uses a key identification method for having unique codes using a tri-state method (positive, negative, and null). The identification method creates a set of matching positive and negative codes each representing a mathematically opposite scenario. Once it has been determined which tire or tires are low the algorithm can calculate the proper detection threshold for each scenario. The initial threshold will always start with the lowest threshold of the two front tires. Typically this is the tire supporting the most weight.

Continuing to Block 320 a weight correction detection threshold is used to modify the diagonal detection routine. The present invention compensates for the driven wheels and weight distribution of a vehicle. For example, in a front wheel drive vehicle the driven front wheels exhibit a higher incidence of wheel slip and a higher incidence of deflection due to weight. In a front wheel drive system the vehicle weight distribution is generally in the range of 60/40. Typically, the undriven wheels show greater deflection at pressure loss than do the driven wheels at the same pressure loss because the rear tires have 20% less weight and therefore less initial deflection. A single detection threshold of 30% below (21 PSI) the placard pressure of 30 PSI that is set for both front tires would cause both rear tires to enable the low tire telltale when the rear tires are at 23% (23.1 PSI) below placard pressure. DiagDetect % corresponds to the diagonal ratio, LFDetect % corresponds to the left front ration, RRDetect % corresponds to the right rear ratio, RFDetect % corresponds to the right front ratio, and LRDetect % corresponds to the left rear ratio.

The wheel slip and weight distribution of a vehicle will increase the likelihood of false positives for a tire pressure fault if the wheel slip and weight distribution are not compensated for. It is desirable to use separate calibrations for the dual front and dual rear tire pressure fault detection.

Weight distribution of a vehicle is standard data known to all vehicle manufacturers. In one example a General Motors vehicle know as the Saturn Ion, has a weight distribution of:

| LF-916.5 lbs., | RF-824.5 lbs. | Total 2904 lbs. |
| LR-555 lbs., | RR-608 lbs. | |

The LF tire is deflected the most, as it supports the most weight, and the LF tire will preferably serve as the baseline detection threshold of which all other detection thresholds will be formed. Weight ratios are formed:

$LF$ wt Ratio=$LF$ wt./($LF+RF+LR+RR$ wt)=0.3156

$RF$ wt Ratio=$RF$ wt./($LF+RF+LR+RR$ wt)=0.2839

$LR$ wt Ratio=$LR$ wt./($LF+RF+LR+RR$ wt)=0.1911

$RR$ wt Ratio=$RR$ wt./($LF+RF+LR+RR$ wt)=0.2094.

The primary characterization will reflect this weight distribution and correct for the additional weight of the driver and passengers or cargo (if any).

The $LFRR$ diagonal weight distribution=(0.3156+0.2094)=0.5250

The $LFRF$ front weight distribution=(0.3156+0.2839)=0.5995

The $LFLR$ left weight distribution=(0.3156+0.1911)=0.5067

The baseline characteristic of tire deflection due to weight change is formed based on the vehicle tires sensitivity to the change in Revolutions Per Meter or Kilometer (RPK) versus additional weight. Based on ION tire data the following calculations were determined empirically.
Tire deflection per lb.=0.00175 (RPK)

$LFRR$ Diagonal=$8009 $h$=0.500138=0.2541 ($RPK$)=+145 lbs.

As opposed to 3 RPK for front 30% low & 4.4 RPK for rear 30% low $LFRF$ Front=$8024 $h$=0.50055=1.013 ($RPK$)=+578 lbs.

As opposed to 3 RPK for fronts 30% low & 4.4 RPK for rears 30% low $LFLR$ Left=$8002 $h$=0.50004=0.0684 ($RPK$)=+39 lbs.

As opposed to 3.7 RPK for left or right side low.
The baseline threshold is formed based on the vehicle tires sensitivity to the change in Revolutions Per Kilometer (RPK) versus pressure loss.

$LF$ detect %=30%=4 Revolutions Per Kilometer ($RPK$)=0.3156 ($LF$ wt Ratio)

Each corner tire is then corrected to reflect the difference in tire weight deflection.

$RF$ wt correction=$LF$ wt Ratio+($LF$ wt Ratio (0.3156)−$RF$ wt Ratio (0.2839))=0.3473

$RF$ Detect %=33%=($RF$ wt correction (0.3473)/$LF$ wt Ratio (0.3156))*30%=4.4 $RPK$ $LR$ wt correction=$LF$ wt Ratio+($LF$ wt Ratio(0.3156)−$LR$ wt Ratio(0.1911))=0.4401

$LR$ Detect %=42%=($LR$ wt correction (0.4401)/$LF$ wt Ratio (0.3156))*30%=5.6$RPK$ $RR$ wt correction=$LF$ wt Ratio+($LF$ wt Ratio(0.3156)−$RR$ wt Ratio(0.2094))=0.4218

RR Detect %=40%=(RR wt correction (0.4218)/LF wt Ratio (0.3156))*30%5=5.3 RPK

Detection thresholds for any combination of low tires may be calculated using the above factors and referenced to Table 2.

TABLE 2

|  | Low Tire scenarios | | | |
|---|---|---|---|---|
| Nominal- | | | Left side Diagonal | |
| Characterization | Diagonal | Front | 1 > $8000 | |
| −10 PSI each tire | $8000 | $8000 | $8000 | Truth table |
| LF | 8017 | 8017 | 8017 | LF Detect % |
| RF | 7FE9 | 8017 | 7FE9 | RF Detect % |
| LR | 7FDF | 7FDF | $8021 | LR Detect % |
| RR | 8021 | 7FDF | 7FDF | RR Detect % |
| LF + RF | 8000 | 802E | 8000 | LF Detect % + RF Detect % |
| LR + RR | 8000 | 7FBE | 8000 | LR Detect % + RR Detect % |
| LF + LR | 8000 | 8000 | 8038 | LF Detect % + LR Detect % |
| RF + RR | 8000 | 8000 | 7FC8 | RF Detect % + RR Detect % |
| LF + RR | 8038 | 8000 | 8000 | LF Detect % + RR Detect % |
| RF + LR | 7FC8 | 8000 | 8000 | RF Detect % + LR Detect % |
| LF + RF + LR | 7FDF | 8021 | 8021 | LF Detect % + RF Detect % + LR Detect % |
| LF + RF + RR | 8021 | 8021 | 7FDF | LF Detect % + RF Detect % + RR Detect % |
| LF + RR + LR | 8017 | 7FE9 | 8017 | LF Detect % + RR Detect % + LR Detect % |
| RF + RR + LR | 7FE9 | 7FE9 | 7FE9 | RF Detect % + RR Detect % + LR Detect % |
| LF + RF + RR + LR | 8000 | 7FF6 | 8000 | (LF + RF Detect %) − (RR + LR Detect %) |

At block 324, the absolute value of the new diagonal ratio (Diag Ratios) is subtracted from the reference value 0.5 and the difference is compared to the diagonal low tire detection threshold. If the difference is found to be greater than the detection threshold, the diagonal odometer/counter (DiagOdom) is incremented by a tenth of a mile at block 326.

Block 328 determines if the DiagOdom has reached the distance necessary to illuminate the low tire telltale. Since this method is based on distance and government regulations use a time base, the detection distance of the present invention is adjusted with vehicle speed to illuminate the telltale within a given time period at any speed. The adaptive detection distance uses a minimum of calibration, K_Dmin (preferably 5 miles or 50 $1/10^{th}$ mile records), at speeds of K45_mph (45 mph), and less. The method adds distance at speeds greater than K45_mph, by dividing the delta speed by calibration KhispdOdom. Because distance data is received three times faster at 75 MPH than at 25 MPH, this method will allow optimum detection time at low speed and high speed.

DiagOdom=K_Dmin+(Vehicle speed−K45_mph)/KhispdOdom.

The present method shapes the detection distance at various speeds.

If the DiagOdom is not greater than the detection distance, the routine will continue to block 330. Blocks 330 through blocks 338 determine if the vehicle is in a steady state where valid front and side records are collected. Block 330 determines if the acceleration is greater than a calibration (Kaccel). Block 332 determines if the lateral acceleration is greater than a calibration (KLataccel). Block 334 determines if the average compass reading indicates that the vehicle is on a curvature of road that would yield a bad side record similar to block 228. Block 336 determines if the fuel float sensor indicates the vehicle is on a grade or incline that would yield a bad front record similar to block 230. Block 338 determines if the New minus the Old Front Ratio is within a repeatability dead band. If the difference is not repeatable, the method exits. If the difference is repeatable the method forms a new front ratio (FrontRatio) average at block 340. At block 342, the method determines whether to use the front or rear tires detection threshold. If FrontRatio is greater than 0.5, the method uses the front tires weight-corrected detection threshold at block 344. Otherwise, the method uses the rear tires weight-corrected detection threshold at block 346.

At block 348 the absolute value of the new FrontRatio is subtracted from the reference value 0.5 and the difference is compared to the weight-corrected front low tire detection (FrontDetect %) threshold. If the difference is found to be greater than the detection threshold the front odometer/counter (FrontOdom) is incremented a tenth of a mile at Block 350. Block 352 determines if the FrontOdom has reached the distance necessary to illuminate the low tire telltale. The distance that is necessary to turn on the telltale is adapted to vehicle speed, as described above.

Figure 5A:
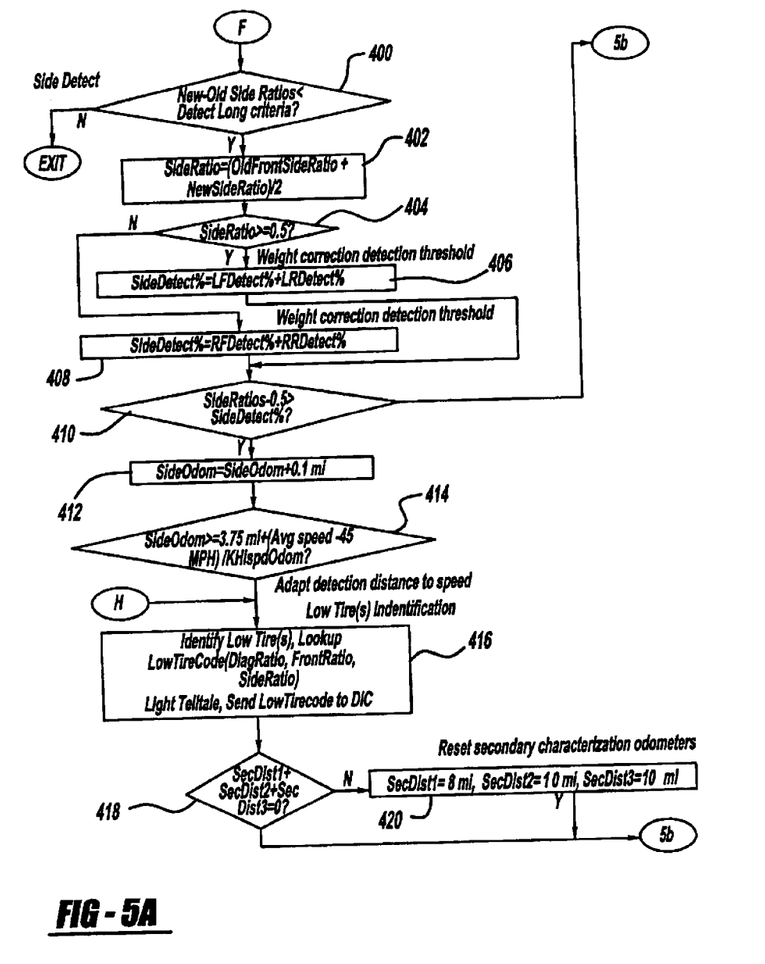
Figure 5B:
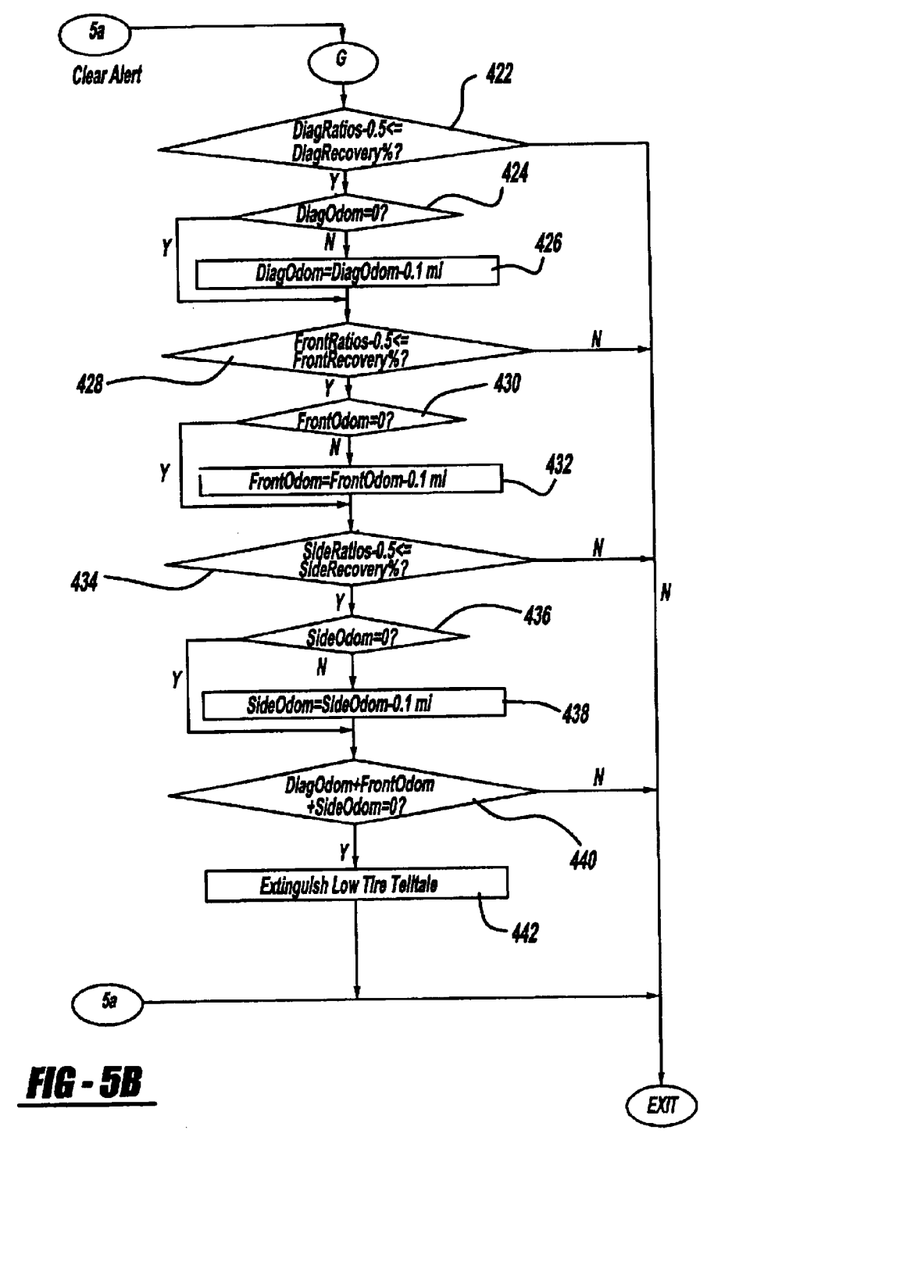

Referring to FIGS. 5a–5b, block 400 determines if the New minus the Old Side Ratio meet the Detect Long Criteria (within a repeatability dead band). If the New Ratios do not meet the criteria, the method exits. If New Ratios meet the criteria, the method forms a new side ratio (Side Ratio) averaged at block 402 where the SideRatio=(OldSideRatio+NewSideRatio)/2. At block 404, the method determines whether to use the left or right tires detection threshold. If the Side Ratio is greater than 0.5 the method uses the left side tires weight-corrected detection threshold at block 406. Otherwise the method uses the right side tires weight-corrected detection threshold at block 408.

At block 410 the absolute value of the new SideRatio is subtracted from the reference value 0.5 and the difference is compared to the weight-corrected side low tire detection threshold (SideDetect %). If the difference is found to be greater than the detection threshold, then at block 412 the side odometer/counter (SideOdom) is incremented a tenth of a mile. Block 414 determines if the SideOdom has reached the distance necessary to illuminate the low tire telltale. The distance that is necessary to turn on the telltale is adapted to vehicle speed, as described above.

Block 416 identifies the low tire or tires using Tables 1 and 2 and transmits the tire code visually and/or audibly to an operator of the vehicle via and instrument panel or other similar device. Block 418 determines whether the method is still executing the secondary characterization. Low tire alarms are allowed while conducting a secondary characterization in the present invention. If the method is still executing a secondary characterization, then preferably at block 420 the SecDist1 will be set to 8 miles, the SecDist2 will be set to 16 miles and the SecDist3 will be set to 32 miles, but any distance setting is within the scope of the present invention.

The clear tire alert portion of the present method begins at block 422 where the DiagRatios are subtracted from a reference value of one half to determine if the difference is within the recovery threshold, (DiagRecovery %). If the average diagonal ratio is not within the recovery dead band, the method exits. If the recovery criteria is met, the method proceeds to block 424 where the diagonal low tire distance odometer (DiagOdom) is checked to see if it is zero or expired. If the DiagOdom is equal to zero, the method proceeds to block 428. If the DiagOdom is not equal to zero, the method proceeds to block 426 where the diagonal odometer is decremented by a tenth of a mile. At block 428, the Front Ratios are subtracted from a reference value of one half to determine if the difference is within the recovery threshold, (KFrontRecovery %). If the average FrontRatio is not within the recovery dead band, the method exits. If the FrontRatio meets the recovery criteria, the method proceeds to block 430 where the front low tire distance odometer (FrontOdom) is checked to see if it is zero or expired. If FrontOdom is equal to zero, the method proceeds to block 434. If the FrontOdom is not equal to zero, the method proceeds to block 432 where the FrontOdom is decremented by a tenth of a mile.

At block 434, the SideRatios are subtracted from a reference value of one half to determine if the difference is within the recovery threshold, (KSideRecovery %). If the SideRatio is not within the recovery dead band, the method exits. If the SideRatio meets recovery criteria, the method proceeds to block 436 where the side low tire distance odometer (SideOdom) is checked to see if it is zero or expired. If the SideOdom is equal to zero, the method proceeds to block 440. If the SideOdom is not equal to zero, the method proceeds to block 438 where the SideOdom is decremented by a tenth of a mile. At block 442 the low tire telltale is extinguished which requires that all ratios are within the recovery dead bad and all odometers are equal to zero.

While this invention has been described in terms of some specific embodiments, it will be appreciated that other forms can readily be adapted by one skilled in the art. Accordingly, the scope of this invention is to be considered limited only by the following claims.

What is claimed is:

1. A tire pressure detection system for a vehicle having a plurality of wheels comprising:

providing a pulse generating sensor for a plurality of wheels of the vehicle to generate a pulse sum for each wheel as each wheel rotates;

adding the pulse sums from the pulse generating sensors of each wheel to generate a total sum of pulses for all the pulse generating sensors;

comparing the total sum of pulses to a calibrated pulse sum;

comparing the pulse sum of at least one wheel to an individual wheel calibrated pulse sum when the total sum of pulses is equal to the calibrated pulse sum;

triggering an indicator when the pulse sum of the at least one wheel is not equal to the individual wheel calibrated pulse sum; and determining if the calibrated pulse sum is valid.

2. The system of claim 1 further comprising receiving the pulse sums from an anti-lock brake system.

3. The system of claim 1 further comprising the anti-lock brake system transmitting the pulse sums periodically.

4. The system of claim 1 wherein the pulse sum corresponds to a distance measurement.

5. The system of claim 1 wherein determining if the calibrated pulse sum is valid comprises collecting records during a characterization process and comparing the records to determine if the records meet a comparison criteria.

6. The system of claim 1 wherein determining if the calibrated pulse sum is valid comprises determining if the records have been collected within a specified vehicle speed range.

7. The system of claim 1 further comprising the step of executing a secondary calibration of the tires to replace the calibrated pulse sum.

8. The system of claim 7 further comprising testing for a tire pressure fault during the secondary calibration.

9. The system of claim 1 further comprising compensating for vehicle weight distribution in said calibrated pulse sum.

10. The system of claim 1 further comprising compensating for road curvature in said calibrated pulse sum.

11. The system of claim 1 further comprising compensating for grade in said calibrated pulse sum.

12. The system of claim 1 further comprising determining if at least one of the tires has a pressure fault using a ratio of pulse counts of the tires.

13. The system of claim 1 wherein ratios of the pulse sums of each tires are compared to determine if a low tire pressure condition exists.

14. A method of detecting tire pressure imbalances in a set of tires of vehicle, the vehicle having four wheels, and each wheel having a sensor generating a pulse for a predetermined amount of distance traveled by the wheel, the method comprising:

entering a characterization mode;

accumulating a number of pulses from each sensor and adding the number of pulses from each sensor to generate a calibrated total pulse count in the characterization mode;

storing the individual pulse sums of each said sensor used to generate the calibrated total pulse count as individual pulse sum calibration values;

storing the calibrated total pulse count;

exiting the characterization mode;

accumulating a number of pulses from each sensor to generate operating individual pulse sums and adding the number of operating individual pulse sums to generate an operating pulse count;

determining if the operating pulse count is equal to the calibrated total pulse count;

comparing at least one of the operating individual pulse sums to the individual pulse sum calibration values when the operating pulse count is equal to the calibrated total pulse count;

triggering an indicator if at least one of the operating individual pulse sums is not equal to the individual pulse sum calibrations; and determining if the calibrated total pulse count is valid using comparison criteria.

15. The system of claim 14 wherein determining if the calibrated pulse sum is valid comprises collecting records during a characterization process and comparing the records to determine if the records are similar in value.

16. The system of claim 14 wherein determining if the calibrated pulse sum is valid comprises determining if the records have been collected within a specified vehicle speed range.

17. The system of claim 14 further comprising the step of executing a secondary calibration of the tires to replace the calibrated pulse sum.

18. The system of claim 17 further comprising testing for a tire pressure fault during the secondary calibration.

19. The system of claim 14 farther comprising compensating for vehicle weight distribution in said calibrated pulse sum.

20. The system of claim 14 further comprising compensating for road curvature in said calibrated pulse sum.

21. The system of claim 14 further comprising compensating for grade in said calibrated pulse sum.

22. The system of claim 14 further comprising determining if at least one of the tires has a pressure fault using a ratio of pulse counts of the tires.

23. A system for detecting tire pressure imbalance in a vehicle comprising:
   a plurality of wheels coupled to the vehicle;
   a plurality of pulse generating sensors operatively coupled to said plurality of wheels, each said pulse generating sensor generating a pulse for a predetermined amount of distance traveled by each said wheel;
   a controller for receiving said pulses generated by said plurality of pulse generating sensors;
   wherein said controller accumulates individual pulse sums from each of said pulse generating sensors pulses to generate a record of a sum of total pulses;
   wherein said controller stores said individual pulse sums and said record;
   wherein said record is analyzed to determine if it is a valid record using comparison criteria.

24. A method of characterizing for tire pressure imbalances in a set of tires of vehicle, the vehicle having four wheels, and each wheel having a sensor generating a pulse for a predetermined amount of distance traveled by the wheel, the method comprising:
   entering a first characterization mode;
   accumulating a number of pulses from each sensor and adding the number of pulses from each sensor to generate a first record total pulse count in the characterization mode;
   generating a second record total pulse count in the characterization mode;
   determining if the first record is similar to the second record; and
   discarding at least one of the first and second records if the first and second records are not similar.

25. The system of claim 24 further comprising determining if the if the records have been collected within a specified vehicle speed range.

26. The system of claim 24 further comprising the step of executing a secondary characterization of the tires to replace the first characterization.

27. The system of claim 26 further comprising testing for a tire pressure fault during the secondary characterization.

28. The system of claim 24 further comprising compensating for vehicle weight distribution in at least one said record.

29. The system of claim 24 further comprising compensating for road curvature in at least one said record.

* * * * *